(12) United States Patent
Rodrigues et al.

(10) Patent No.: US 7,326,035 B2
(45) Date of Patent: Feb. 5, 2008

(54) DEVICE FOR ATTACHING A MOVING BLADE TO A TURBINE ROTOR DISK IN A TURBOMACHINE

(75) Inventors: Paul Rodrigues, Savigny sur Orge (FR); Jean-luc Soupizon, Vaux le Penil (FR)

(73) Assignee: Snecma Moteurs, Paris (FR)

( * ) Notice: Subject to any disclaimer, the term of this patent is extended or adjusted under 35 U.S.C. 154(b) by 198 days.

(21) Appl. No.: 10/961,064

(22) Filed: Oct. 12, 2004

(65) Prior Publication Data
US 2005/0084375 A1  Apr. 21, 2005

(30) Foreign Application Priority Data
Oct. 16, 2003  (FR) .................................. 03 12064

(51) Int. Cl.
*B63H 1/06* (2006.01)
(52) U.S. Cl. ..................... 416/142; 416/53; 416/219 R
(58) Field of Classification Search ................ 416/216, 416/219 R, 237, 142, 53
See application file for complete search history.

(56) References Cited
U.S. PATENT DOCUMENTS

| 1,027,201 | A |   | 5/1912 | Grun |
| 2,295,012 | A | * | 9/1942 | Semar ..................... 416/201 R |
| 2,669,383 | A |   | 2/1954 | Purvis et al. |
| 3,957,229 | A | * | 5/1976 | Davis ....................... 244/53 R |
| 4,394,109 | A | * | 7/1983 | Ritchie ...................... 416/142 |
| 4,460,315 | A |   | 7/1984 | Tseng et al. |
| 5,584,658 | A | * | 12/1996 | Stenneler ................... 416/215 |
| 7,029,237 | B2 | * | 4/2006 | Follonier et al. .......... 416/215 |

FOREIGN PATENT DOCUMENTS

| DE | 898 150 | 11/1953 |
| DE | 2217 079 | 10/1973 |
| EP | 0 502 660 A1 | 9/1992 |
| EP | 1 312 756 A2 | 5/2003 |
| FR | 480.958 | 10/1916 |
| FR | 2 502 691 | 10/1982 |
| GB | 260411 | 11/1926 |
| GB | 2 151 310 A | 7/1985 |

* cited by examiner

*Primary Examiner*—Hoang Nguyen
(74) *Attorney, Agent, or Firm*—Oblon, Spivak, McClelland, Maier & Neustadt, P.C.

(57) ABSTRACT

An attachment device for attaching a blade to a turbine rotor disk in a turbomachine, the blade root forming a male portion engaged and held radially in a cavity of complementary shape in the rotor disk, with means for preventing the blade root from moving axially in the cavity, the blade axis being inclined relative to a perpendicular to the axis of rotation of the rotor, in a direction and at an angle that are designed to compensate at least in part for the displacement of the axis of the blade caused by the mechanical and thermal stresses applied to the rotor during operation of the turbomachine.

17 Claims, 6 Drawing Sheets

DEVICE FOR ATTACHING A MOVING BLADE TO A TURBINE ROTOR DISK IN A TURBOMACHINE

The present invention relates to a device for attaching a moving blade to a turbine rotor disk in a turbomachine, such as an aviation turbojet or turboprop.

BACKGROUND OF THE INVENTION

In such turbomachines, the rotor blades of the turbine stages are mounted on rotor disks by engaging male portions formed by the roots of the blades in cavities formed in the disks of the rotor, with such male/female engagement being of the dovetail or Christmas-tree type, for example, so that the blades are held radially for the disks of the rotor. Means are provided for preventing the roots of the blades from moving axially in the slots in the disks.

At rest, the axes of the blades are accurately perpendicular to the axis of rotation of the rotor.

It is found that the structure of the rotor is subjected to forces that are axial, radial, and tangential, and also to temperature gradients, thus leading to deformations that cause parasitic axial displacements of the free ends of the blades. Thus, while the turbomachine is in operation, the blades take up a configuration that is not perpendicular relative to the axis of rotation of the rotor. This configuration reduces the efficiency of the turbine, and thus reduces the performance of the turbomachine.

OBJECTS AND SUMMARY OF THE INVENTION

An object of the present invention is to mitigate those drawbacks, by means of an attachment device enabling the axes of the blades to be accurately perpendicular to the axis of rotation of the rotor while the turbomachine is in operation.

This object is achieved by means of an attachment device for attaching a blade to a turbine rotor disk in a turbomachine, the blade root forming a male portion engaged and held radially in a cavity of complementary shape in the rotor disk, with means for preventing the blade root from moving axially in the cavity, wherein at rest and under uniform temperature conditions, the axis of the blade is inclined upstream or downstream relative to a perpendicular to the axis of rotation of the rotor, in a direction and at an angle that are designed to compensate at least in part for the displacement of the axis of the blade caused by the mechanical and thermal stresses applied to the rotor during operation of the turbomachine.

In a first embodiment of the invention, a surface of the cavity co-operating with a surface of the blade root that is perpendicular to the axis of the blade is inclined at an angle $\alpha$ relative to the axis of rotation of the rotor.

In another embodiment of the invention, a surface of the blade root co-operating with a surface of the cavity that is perpendicular to the axis of rotation of the rotor is inclined at an angle $\alpha$ relative to the perpendicular to the axis of the blade.

The angles $\alpha$ and $\alpha'$ are determined so that the axes of the blades are substantially perpendicular to the axis of rotation of the rotor in operation, i.e. so that the angles $\alpha$ and $\alpha'$ are defined as a function of the angular compensation needed between the position of a blade axis at rest and its position in operation.

The angles $\alpha$ and $\alpha'$ lie in the range $-1.5°$ to $+1.5°$.

It has been found that the parasitic displacements of the blades are not all directed in the same direction, and that although most of the blades of the various stages of the turbine become inclined downstream in operation, the blades of some other stage may become inclined upstream.

The device of the invention makes it possible to compensate the parasitic deflections of the blades of the various stages independently from one another.

In general, an advantage of the present invention is to improve the efficiency of the turbine and thus to improve the performance of the turbomachine, by keeping the moving blades substantially perpendicular relative to the axis of rotation of the rotor while the turbomachine is in operation.

BRIEF DESCRIPTION OF THE DRAWINGS

Other advantages and characteristics of the invention will appear on reading the following description made by way of non-limiting example and with reference to the accompanying drawings, in which.

MORE DETAILED DESCRIPTION

Figure 1:
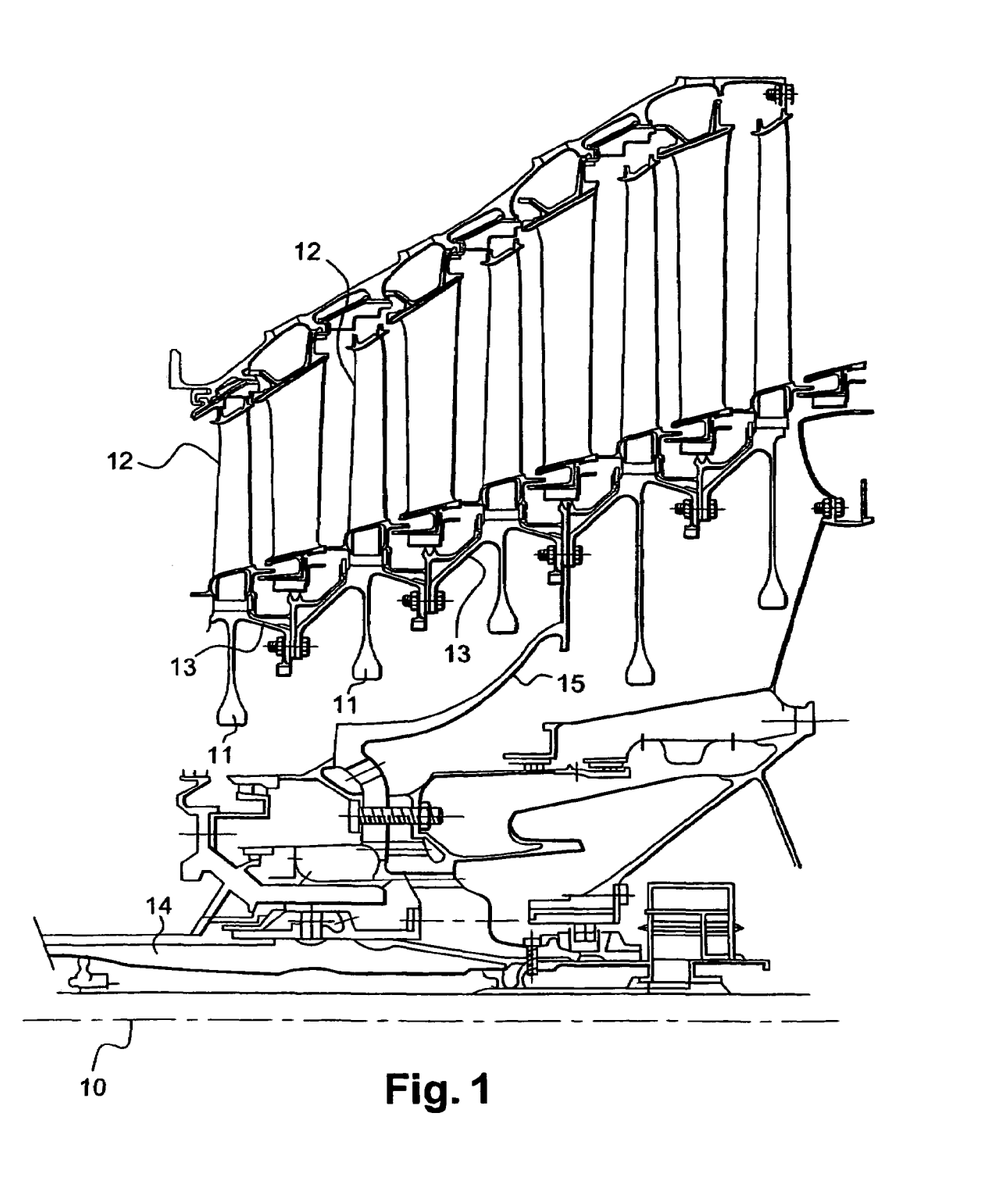
FIG. 1 is a diagrammatic longitudinal view of a turbomachine rotor in section on a plane containing the axis of rotation of the rotor, and it shows the prior art.

Reference is made initially to FIG. 1, which is a diagrammatic longitudinal view of a turbomachine rotor in section on a plane containing the axis 10 of rotation of the rotor. The rotor comprises turbine disks 11 that are interconnected, blades 12 attached to said disks, and systems 13 for preventing the blades from moving axially relative to the disks, which systems are made up of shields and retaining rings disposed between the blades and fixed to the disks in a manner that can be seen more clearly in FIG. 2. The rotor is connected to the shaft of the turbine 14 via a drive cone 15.

Figure 2:
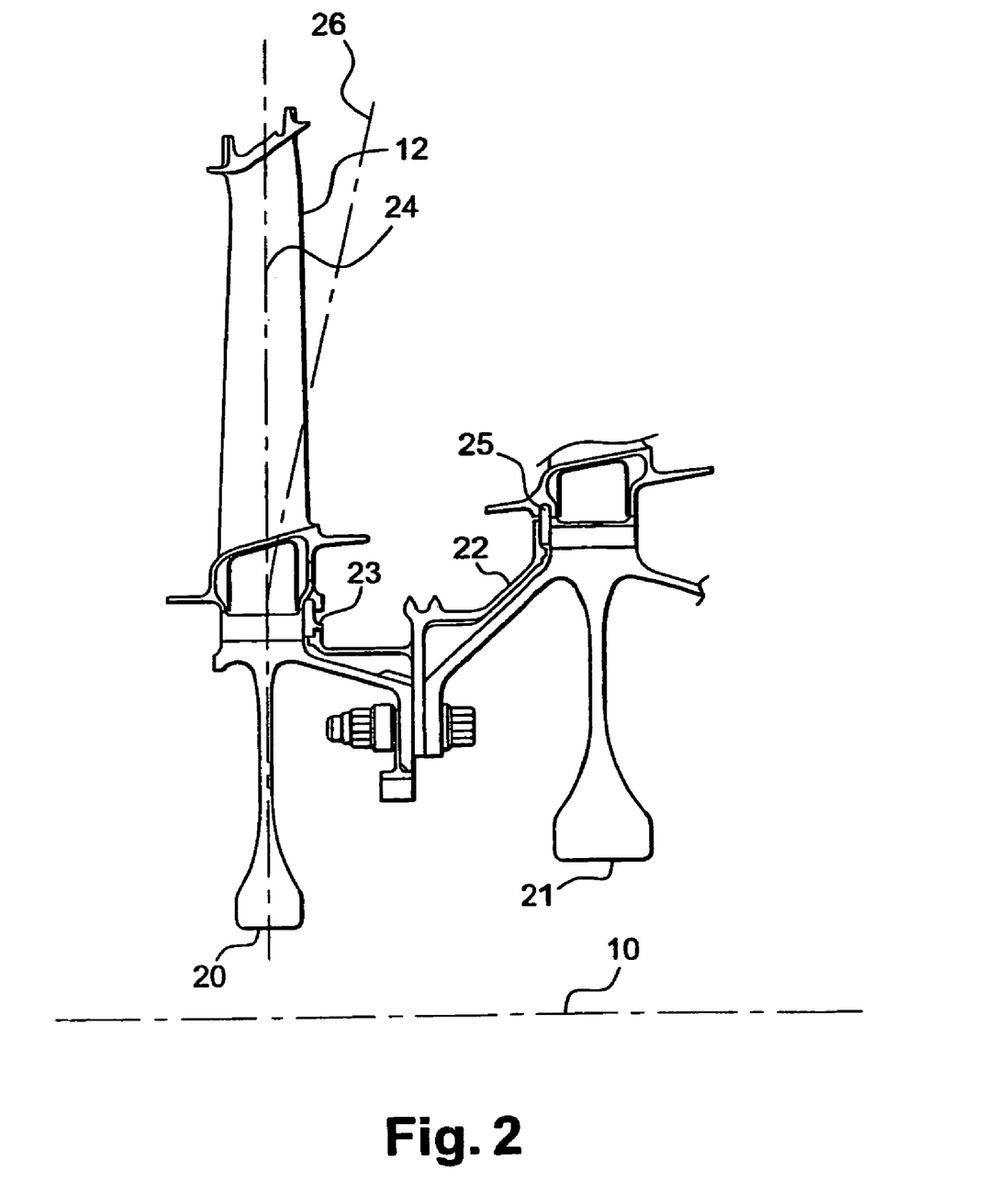
FIG. 2 is a view on a larger scale of a portion of FIG. 1.

In FIG. 2, it can be seen that two consecutive turbine disks 20 and 21 are interconnected by a shield 22 extending perpendicularly between the disks 20 and 21 and along the axis of rotation. A retaining ring 23 is placed between a first rotor disk 20 and the shield 22, and another retaining ring 25 is placed between the shield 22 and the other rotor disk 21.

In the prior art, the axis 24 of the blade 12 extends perpendicularly to the axis 10 of rotation of the rotor, at rest and at normal temperature.

Figure 3:
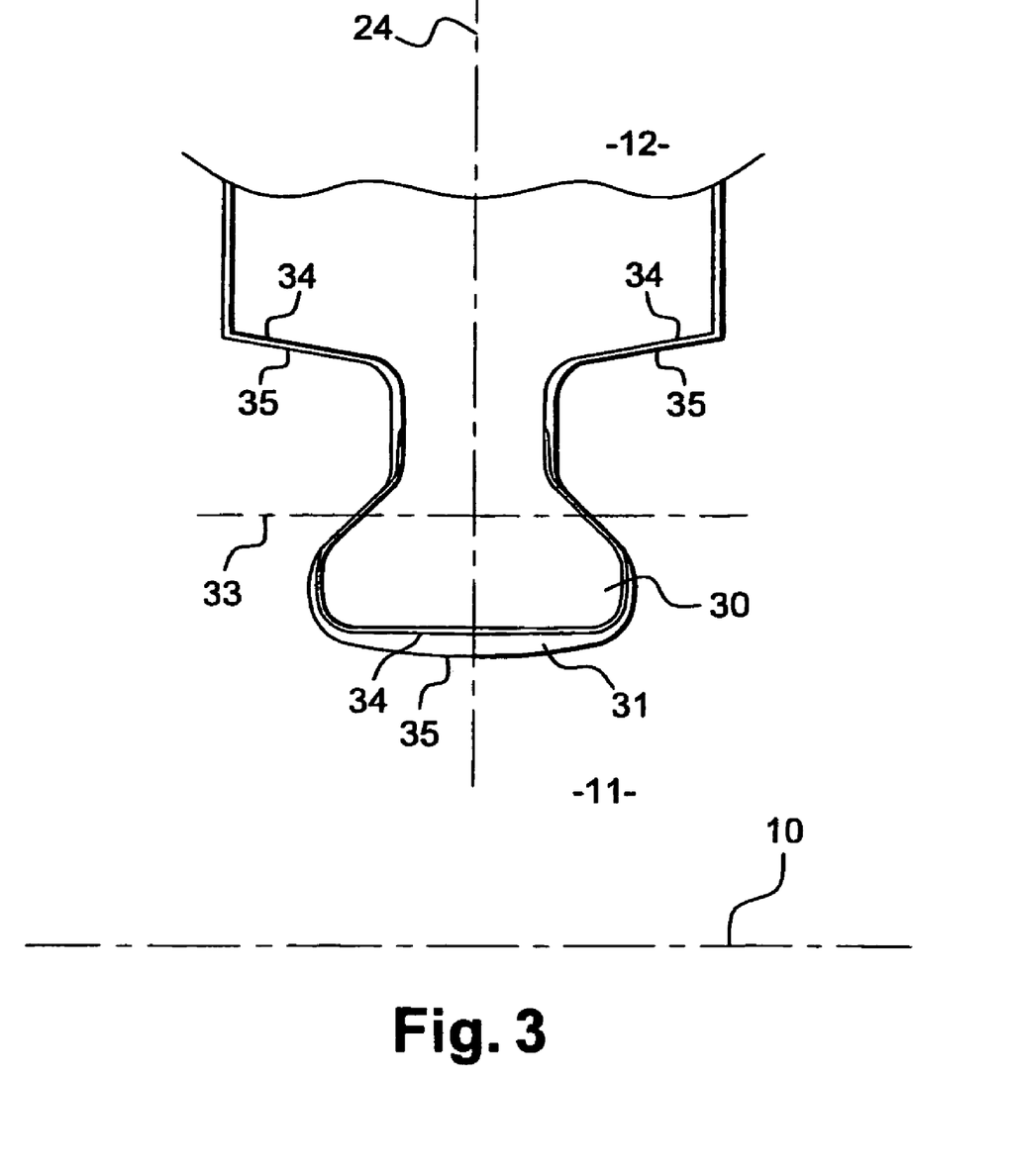
FIG. 3 is a diagrammatic longitudinal view of a device for attaching a moving blade to a rotor disk, shown on a plane perpendicular to the axis of rotation of the rotor.

FIG. 3 shows known means for radially retaining a blade 12 on a rotor disk 11, which means are of the dovetail type and comprise a male portion 30 formed at one end of the blade 12 and attached to the corresponding disk 11 of the rotor, said portion being referred to as the blade root 30 or bulb, and co-operating with a female portion 31 formed in the periphery of the rotor disk 11 by a cavity referred to as a slot.

The blade root 30 has a plane surface 34 parallel to the axis of rotation 10 and facing a substantially plane surface 35 forming the bottom of the slot 31.

When the turbomachine is in operation, the structure of the rotor is subjected to axial, radial, and tangential forces and also to temperature gradients, leading to deformations that cause parasitic axial displacements of the free ends of the blades 12. In FIG. 2, it can be seen that the axis 24 of a blade thus takes up an orientation 26 that is not perpendicular to the axis 10 of rotation of the rotor, with the parasitic inclinations of the blade axes then being directed either downstream or upstream. In addition, temperature gradients lead to expansion of the material constituting the blades 12 and to parasitic radial displacements of said blades 12 relative to the axis 10 of rotation of the rotor.

Figure 4:
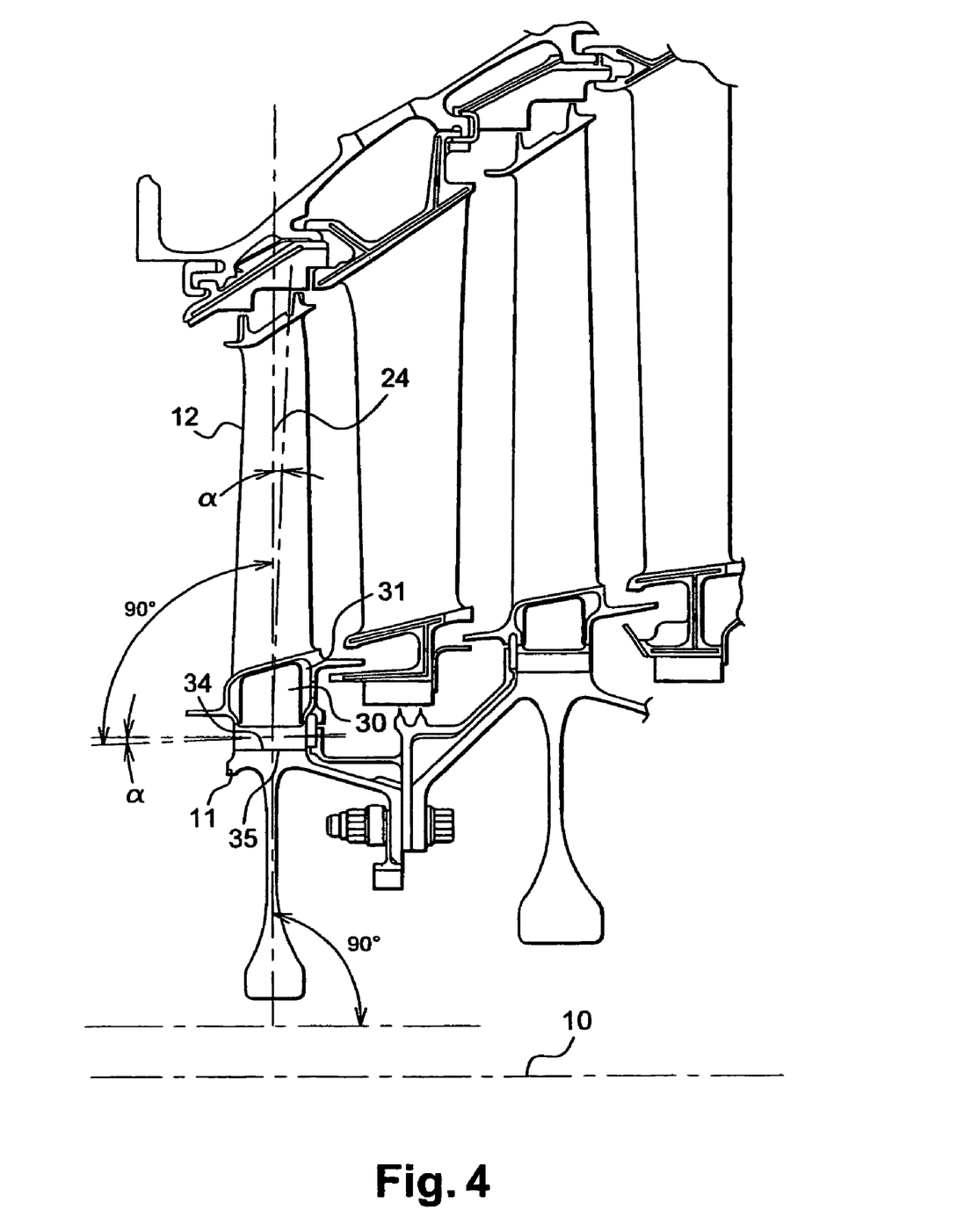
FIGS. 4 and 5 are views on a larger scale corresponding to a portion of FIG. 1, and showing two embodiments of the invention.

In a first embodiment of the invention, shown in FIG. 4, the surface 35 of the cavity 31, or slot, that corresponds to the surface 34 of the blade root 30 that is perpendicular to the axis of the blade 24, is inclined upstream at an angle $\alpha$ relative to the axis 10 of rotation of the rotor.

This means that, at rest, the axis 24 is inclined upstream by the angle $\alpha$, as shown in FIG. 4. In operation, the axial, radial, and tangential stresses, and also the temperature gradients lead to deformations causing axial parasitic displacements of the free ends of the blades 12, having the effect of inclining the axis 24 downstream so as to bring it back into a position that is substantially perpendicular to the axis 10 of rotation of the rotor, the angle of inclination $\alpha$ at rest being determined to compensate as accurately as possible for the parasitic deflections of the blades 12.

Figure 5:
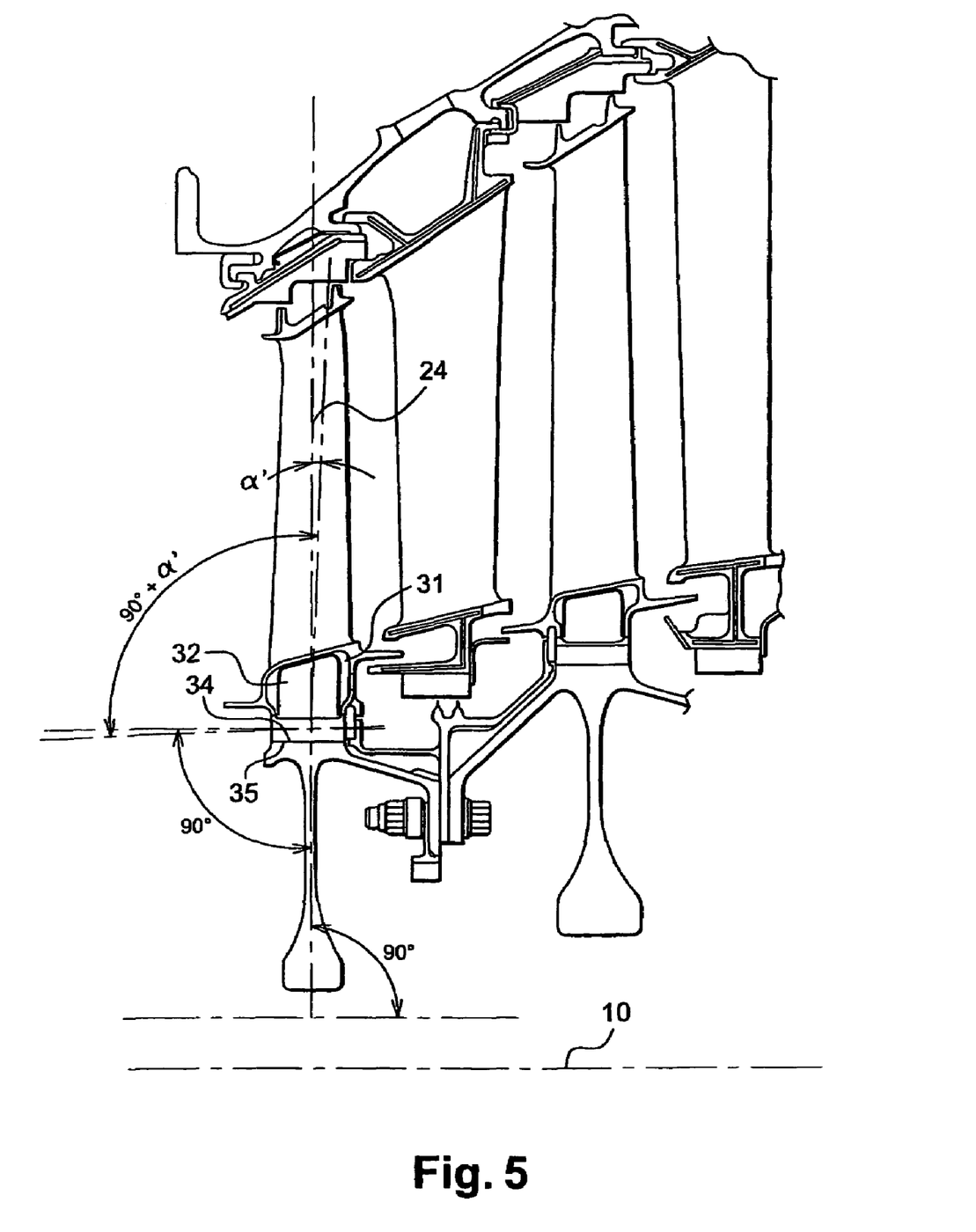

In a second embodiment of the invention, shown in FIG. 5, the surface 34 of the blade root 30 that corresponds to the surface 35 of the cavity 31 or slot that is parallel to the axis 10 of rotation of the rotor is inclined upstream at rest by an angle $\alpha'$ relative to the perpendicular to the axis of the blade 24.

This has a consequence that, at rest, the axis 24 is inclined upstream by the angle $\alpha'$, as shown in FIG. 5. In operation, the above-mentioned stresses have the effect of raising the axis 24 so that it returns into a position that is substantially perpendicular to the axis 10 of rotation of the rotor, with the angle $\alpha'$ being previously determined so as to compensate as accurately as possible for the parasitic deflections of the blades 12.

The parasitic deflections of the blades can be directed downstream or upstream in different stages. At rest, and under normal temperature conditions, the attachment device of the invention enables the axes of the blades 24 to be inclined through an angle $\alpha$ or $\alpha'$ upstream or downstream independently of one another in the various stages of the turbine in order to compensate as well as possible for the parasitic inclinations of the axes and bring them back into positions that are perpendicular to the axis 10 of rotation of the rotor in operation.

The device is not limited to a single embodiment per turbomachine. A turbomachine may include both embodiments of the invention, i.e. both one or more stages in which the surfaces 35 of the cavities 31 co-operating with the surfaces 34 of the blade roots 30 that are perpendicular to the axes of the blades 24 are inclined through an angle $\alpha$ relative to the axis 10 of rotation of the rotor, and also one or more disks in which the surfaces 34 of the blade roots 30 co-operating with the surface 35 of the cavities 31 that are parallel to the axis 10 of rotation of the rotor are inclined through an angle $\alpha'$ relative to the perpendiculars to the axes of the blades 24.

Figure 6:
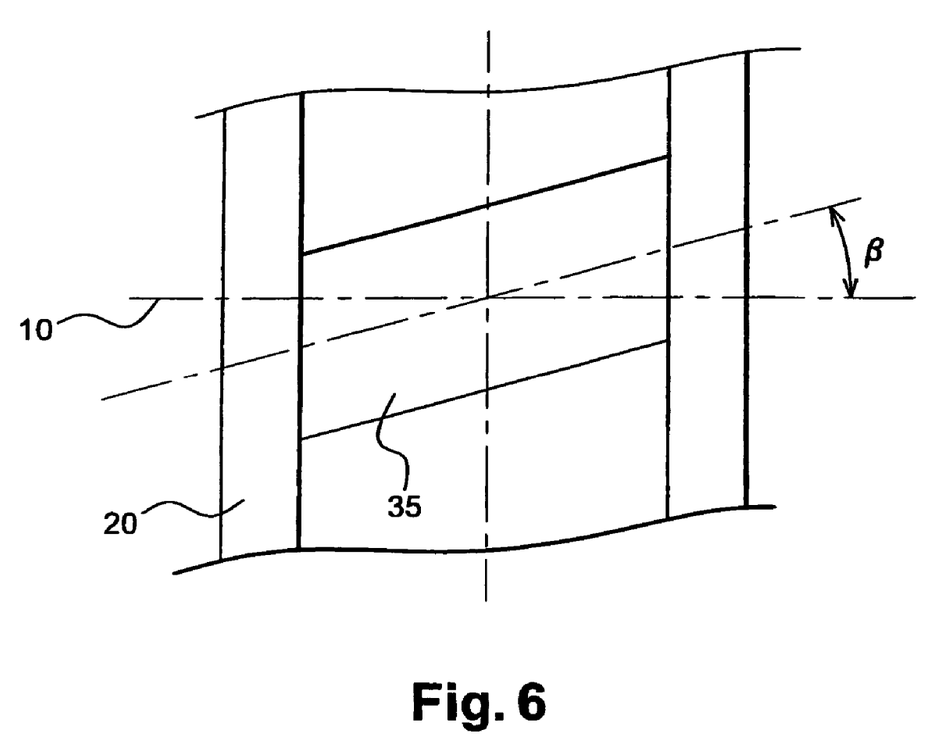
FIG. 6 is a fragmentary diagrammatic view of the bottom of a cavity seen looking in a radial direction from outside the rotor.

The connection device of the invention is applicable to connections between blades and rotor disks in which the cavities or slots 31 are not necessarily oriented parallel to the axis 10 of rotation of the rotor. FIG. 6 shows a configuration in which the bottom surface 35 of a cavity or slot 31 is oriented longitudinally in a direction that makes an angle $\beta$ relative to the axis 10 of rotation of the rotor.

This orientation is also that of the blade root 30 which is received in the cavity or slot 31. More precisely, the angle $\beta$ is the angle between firstly the longitudinal direction of the cavity 31 and of the blade root 30, and secondly a line parallel to the axis 10 of rotation and lying in the plane of FIG. 6, which is a plane parallel to the axis 10 of rotation of the rotor.

What is claimed is:

1. An attachment device for attaching a blade to a turbine rotor disk in a turbomachine, the blade root being engaged axially in a slot of the rotor disk, the blade root and the slot having a substantially longitudinal orientation and having complementary shapes for holding the blade onto the disk, the device comprising means for preventing the blade root from moving axially in the slot, wherein at rest and under uniform temperature conditions, the axis of the blade is inclined upstream or downstream relative to a plane perpendicular to the axis of rotation of the rotor, in a direction and at an angle that are configured to compensate at least in part for the displacement of the axis of the blade resulting from the deformation of the blade that is caused by the mechanical and thermal stresses applied to the rotor during operation of the turbomachine so that the axis of the blade is substantially perpendicular to the axis of rotation during operation of the turbomachine.

2. An attachment device according to claim 1, wherein a surface of the slot co-operating with a surface of the blade root that is perpendicular to the axis of the blade is inclined at an angle $\alpha$ relative to the axis of rotation of the rotor.

3. An attachment device according to claim 1, wherein a surface of the blade root co-operating with a surface of the slot that is perpendicular to the axis of rotation of the rotor is inclined at an angle $\alpha'$ relative to the perpendicular to the axis of the blade.

4. An attachment device according to claim 2 or claim 3, wherein the angle $\alpha$ or $\alpha'$ is determined so that the axis of the blade is substantially perpendicular to the axis of rotation of the rotor in operation.

5. An attachment device according to claim 2 or claim 3, wherein the angle $\alpha$ or $\alpha'$ lies in the range $-1.5°$ to $+1.50°$.

6. An attachment device according to claim 1, wherein, at rest, the axis of the blade is directed upstream.

7. An attachment device according to claim 1, wherein, at rest, the axis of the blade is directed downstream.

8. An attachment device according to claim 1, wherein the means for preventing the blade root from moving axially in the slot comprise an annular retaining ring pressed into place by a shield carried by the rotor disk.

9. An attachment device according to claim 1, wherein the slot and the blade root have a longitudinal orientation that is parallel to the axis of rotation of the rotor, or that makes an angle $\beta$ relative to said axis in a plane parallel to the axis of rotation.

10. An attachment device according to claim 1, wherein the blade root and the slot are of the dovetail type.

11. A turbine, comprising a blade attachment device according to claim 1.

12. A turbomachine, comprising a blade attachment device according to claim 1.

13. An attachment device according to claim 1, wherein the cavity and the blade root have a longitudinal orientation that is parallel to the axis of rotation of the rotor.

14. An attachment device according to claim 1, wherein the cavity and the blade root have a longitudinal orientation that makes an angle β relative to said axis in a plane parallel to the axis of rotation.

15. An attachment device according to claim 1, wherein the axis of the blade is perpendicular to the axis of rotation during operation of the turbomachine.

16. An attachment device according to claim 1, wherein the blade root is mounted in the rotor disk with clearance in the longitudinal slot of the rotor disk between a bottom of the blade root and a bottom of the longitudinal slot.

17. An attachment device according to claim 1, wherein the blade root is rigidly connected to the blade.

* * * * *

UNITED STATES PATENT AND TRADEMARK OFFICE
CERTIFICATE OF CORRECTION

| | |
|---|---|
| PATENT NO. | : 7,326,035 B2 |
| APPLICATION NO. | : 10/961064 |
| DATED | : February 5, 2008 |
| INVENTOR(S) | : Paul Rodrigues et al. |

Page 1 of 1

It is certified that error appears in the above-identified patent and that said Letters Patent is hereby corrected as shown below:

Column 4, Line 44, change "+1.50°" to --+1.5°--.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,326,035 B2 | Page 1 of 1 |
| APPLICATION NO. | : 10/961064 | |
| DATED | : February 5, 2008 | |
| INVENTOR(S) | : Paul Rodrigues et al. | |

It is certified that error appears in the above-identified patent and that said Letters Patent is hereby corrected as shown below:

Column 4, line 36, change "perpendicular" to --parallel--.

Signed and Sealed this

Thirty-first Day of August, 2010

David J. Kappos
*Director of the United States Patent and Trademark Office*